United States Patent Office 3,496,853
Patented Feb. 24, 1970

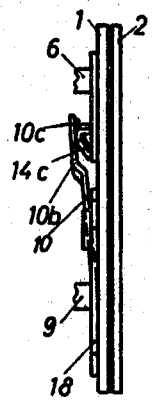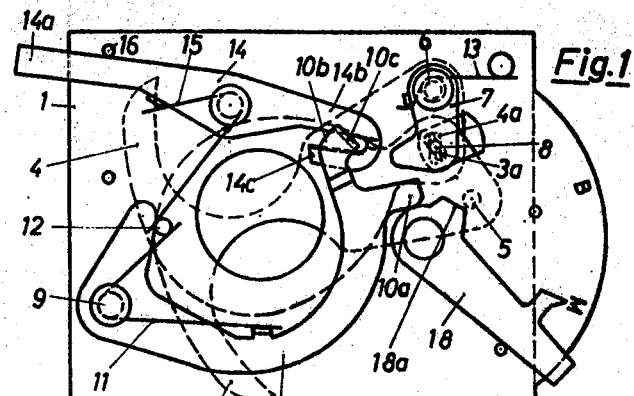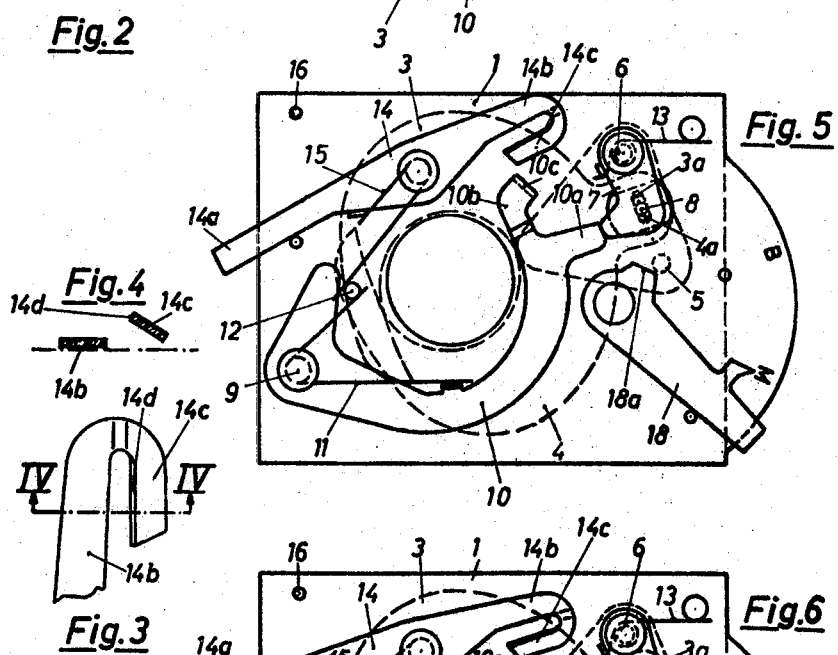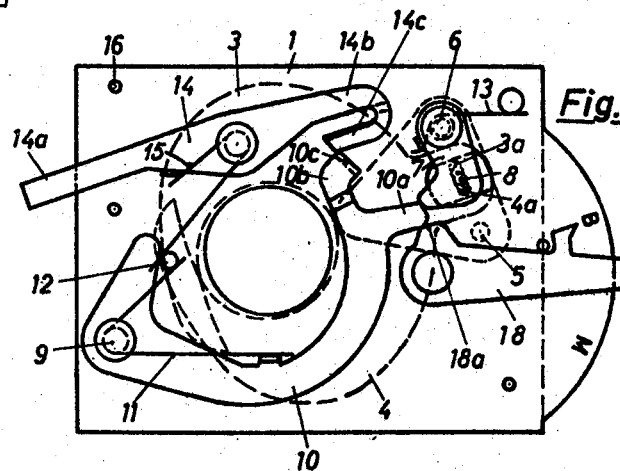

3,496,853
PHOTOGRAPHIC SELF-COCKING SHUTTER
Dieter Rittman, Calmbach, Black Forest, Germany, assignor to Prontor-Werk Alfred Gauthier, G.m.b.H., Calmbach, Black Forest, Germany
Filed July 22, 1966, Ser. No. 567,230
Claims priority, application Germany, July 26, 1965, P 37,319
Int. Cl. G03b 9/14
U.S. Cl. 95—62                          3 Claims

ABSTRACT OF THE DISCLOSURE

A photographic self-cocking shutter having a driving member. The driving member is moved into a cocked position by a cocking and release member against the force of a drive spring. The end of the cocking and release member which engages the driving lever is hook shaped. This hook shaped end is angled so that the edge facing the driving lever is above the plane of motion of the driving lever. The driving member slides off the cocking and release member automatically after reaching the cocked position. During the driving member's return to its starting position, under the force of a return spring, it presses against an actuating member to open the shutter blade.

---

This invention relates to a photographic self-cocking shutter having a driving member which can be moved into the cocked position by a cocking and release member against the force of a drive spring and which, by sliding off automatically after reaching the cocked position, presses upon a shutter actuating member during its return motion and opens the shutter. After the driving member has disengaged again from the shutter-actuating member, the driving member returns to its starting position under the force of a return spring.

Prior self-cocking shutters, although having only a relatively small number of components and therefore being structurally simple, are still afflicted with the drawback of requiring a follower spring to achieve slow opening motions of the shutter and for the actuating member.

It is the object of the present invention to create a self-winding shutter which maintains a functionally safe operation, yet does without a follower spring for the actuating member.

In essence, this problem is solved by providing means which make the driving member, or lever, bypass the shutter actuating member, or lever, during the winding process.

One embodiment of the invention that has been found to be advantageous from a structural as well as functional viewpoint has the end of the cocking and release member, or lever, which cooperates with the driving lever, provided with a hook-shaped part which is angled off relative to the plane of motion of the lever mechanism in such a manner that its edge facing the lever arm is above the plane of motion.

To insure that the mechanism runs down as smoothly as possible, provision is also made for the driving lever to be equipped with a driving tab acting upon the shutter-actuating lever.

To make it possible to take "B" pictures as well as short duration exposures, or snapshots, with the shutter arrangement described above, it is further proposed, according to an additional feature of the invention, to provide a shifting member, or lever, which can swing into the range of motion of the driving tab and which blocks the driving lever in an intermediate position corresponding to the open position of the shutter blades. According to an additional improvement, the object of the invention can also be achieved by providing a positive guidance system in the range of motion of the end of the cocking and release lever cooperating with the driving lever to force the driving tab of the driver lever to bypass the shutter actuating lever. It is also possible to have a lifting cam or the like formed as part of the supporting base plate to serve as the positive guidance system.

The invention will be described in greater detail in the following specification, together with the drawings in which:

FIG. 1 shows the top view of a self-cocking shutter according to the invention and in its starting position set to make an instantaneous exposure;

FIG. 2 is a side view of the shutter of FIG. 1;

FIG. 3 shows the hook-shaped end of the winding and release lever of FIG. 1;

FIG. 4 is a section along line IV—IV of the lever of FIG. 3;

FIG. 5 shows the shutter of FIG. 1 in open position; and FIG. 6 shows the self-cocking shutter of FIG. 1 re-set for shooting "B" pictures and in its open position.

In the drawing are two plates 1 and 2, both of which have a shutter aperture, and, as shown in FIG. 2, are joined to each other but are slightly spaced apart. In the gap between the two plates 1 and 2 are two swiveling shutter sectors, or blades, 3 and 4, pivoted on pins 5 and 6, respectively. The blades 3 and 4 are provided with slots 3a and 4a, respectively and are operated by a shutter-actuating lever 7 which engages the blades 3 and 4 by means of a pin 8. The mounting pin 6 of the blade 4 can serve as the rotational axis for the actuating lever 7.

As may be seen particularly from FIGS. 1, 5 and 6, a driving lever 10, which is pivotally mounted on a fixed shaft 9 so that it can turn, and held against a stop 12 by a driving spring 11, cooperates with the shutter actuating lever 7. In its initial, or rest, position the driving lever 10 partially encircles the shutter aperture and is provided with a driving arm 10a. As shown particularly in FIG. 2, the end 10b of the driving lever 10 is slightly offset to one side and is provided with a bent-off tab 10c having a slightly oblique edge facing the plate 1. A spring 13 engages the actuating lever 7 to provide the necessary force to shut the blades 3 and 4 after they have reached the open position.

To move the driving lever 10 into the cocked position, a centrally pivoted winding, or cocking, and release lever 14 is provided, one arm 14a of which is held against a stop pin 16 by a return spring 15. The arm 14a is the release trigger that actuates the shutter, and the other arm 14b of the cocking and release lever 14 engages the driving lever 10 when the shutter is in its rest position and also during the cocking process. To accomplish this, the lever arm 14b has a hook-shaped part 14c with an end set at an angle, as is shown most clearly in the sectional representation in FIG. 4. The end of the hook 14c is bent so as to be slightly rising relative to the plane of motion of the lever or to the plate 1. The mounting of the two levers 10 and 14 is so chosen that their ends in engagement with each other perform a relative motion during the winding process so that the driving lever 10 finally slides off the lever 14 automatically.

To shoot "B" pictures, a time setting lever 18, which can be moved into two settings and which has a locking edge 18a, normally is located outside the path of travel of the driving arm 10a. In the "B" setting, the lever 18 is pivoted to move the edge 18a into the path of motion of the arm 10a in such a manner that this edge blocks the driving lever 10 from continuing to run down from its cocked position beyond the point at which the blades 3 and 4 are in their open position, as illustrated in FIG. 6. The driving lever is held until the cocking and release lever 14 is released for return to its starting position.

The operation of the above-described shutter is as follows:

If it is intended to take snapshots in which the shutter closes automatically after only a short time, the lever 18 is set to its "M" position, as shown in FIGS. 1 and 5, in which its locking edge 18a is outside of the path of motion of the driving arm 10a of the driving lever 10. When the cocking and release lever 14 is actuated, its hook-shaped part 14c moves counterclockwise to cock the shutter mechanism first by carrying the driving lever 10 along in the same rotational sense by engagement between the tab 10c and the bent-off end 14c. The tension of the driving spring 11 simultaneously increases. Since the end 10b of the driving lever 10 supports itself against the higher edge 14d of the angled-off winding lever 14c during the cocking process, the driving arm 10a is guided above the sector actuating lever 7 without touching it during this cocking motion, the two cooperating lever ends shift relative to each other. After reaching the cocked position, the tab 10c of the driving lever 10 releases the end 14c of the cocking and release lever 14 due to the relative motion of the two lever ends, so that the driving lever can spring toward plate 1 and, at the same time, can run down in the clockwise direction under the effect of the driving spring 11. Since the driving tab 10a is now moving clockwise in a plane that permits it to strike the shutter actuating lever 7, the latter is turned counterclockwise, causing the blades 3 and 4 to be transferred by the driving pin 8 into the open position shown in FIG. 5.

After reaching this intermediate position, the driving lever 10 disengages from the shutter actuating lever 7 which now reverses its direction of travel under the influence of the closing spring 13 and moves the blades 3 and 4 back into their closed position while the driving lever resumes its starting position against the stop 12. When the cocking and release lever 14 is released again, it returns into its starting position under the effect of the return spring 15, the consequence of which is that the bent-off and oblique lever end 14c of the cocking and release lever 14 pushes itself like a wedge under the free end 10b of the driving lever 10, lifting the end 10b, so that the driving arm 10a positions itself again above the plane of motion of the sector actuating lever 7. At the end of the return motion, the tab 10c of the driving lever 10 engages the bent-off part 14c, thus preparing the shutter for the next cocking process.

To shoot "B" pictures, the time setting lever 18 is transferred to the "B" setting as shown in FIG. 6. This moves the locking edge 18a of the time setting lever 18 into such a position relative to the driving arm 10a that the latter, when running down from the cocked position, strikes against the locking edge upon the opening of the blades 3 and 4 but prior to leaving the actuating lever 7. By these means the driving lever 10 is blocked from further upward movement as long as the cocking and release lever 14 is pressed down all the way. After release of the lever 14 the bent off part 14c slides under the free end 10b so that by the raising of the driving arm 10a the actuating lever 7 can move the blades 3 and 4 back into the locked position through the effect of the closing spring 13.

To achieve short exposure times of different duration, means to modify the initial tension of the driving spring 11 may be employed, or a customary delay system could be used to retard the running down motion of the driving lever 10 when the open position of the sectors 3 and 4 is reached.

To lift the driving tab 10a of the driving lever 10 over the actuating lever 7 during the cocking process, a positive guidance system could also be employed, arranged in the path of motion of the end of the cocking and release lever 14 that cooperates with the driving lever. To achieve the desired effect, the positive guidance system could, for instance, be formed by a lifting cam formed in the plate or by a rising and falling strip located in the direction of motion of the cocking and release lever.

It will be understood that while the invention has been described in detail in connection with a specific example thereof in order to describe the same, this description is not to be considered as a limitation upon the scope of the invention. Variations and modifications may be made without departing from the spirit of the invention or defined in the appended claims.

What is claimed is:

1. A photographic self-cocking shutter comprising: a shutter blade; an actuating member connected to said shutter blade to move the same between a closed position and an open position; a cocking and release member; a driving member, movable between an initial position and a cocked position, said cocking and release member engaging said driving member and moving it to a cocked position when said cocking and release member is actuated, said driving member automatically becoming disengaged from said cocking and release member when said driving member reaches its cocked position; means guiding said driving member past said actuating member as said driving member moves from its initial position to its cocked position, said driving member being resiliently biased to engage said actuating member at a position intermediate between the cocked position of said driving member and the initial position; and resilient means urging said driving member back toward its initial position to engage said actuating member in order to move said blade to its open position as the driving member returns to its initial position, said cocking and release member being a lever and comprising a hook-shaped part that engages said driving member to move said driving member from its initial position to its cocked position along a predetermined path lying substantially in a plane, said hook-shaped part being formed obliquely with respect to said plane to have an edge facing said cocking and release lever above said plane.

2. The photographic self-cocking shutter of claim 1 in which said driving member comprises a driving tab that engages said actuating member as said driving member moves from its cocked position back to its initial position.

3. The photographic self-cocking shutter of claim 2 comprising, in addition: a time-setting member movable into the path of motion of said driving tab to block said driving member and said actuating member in an intermediate position corresponding to the open position of said blade.

References Cited

UNITED STATES PATENTS

| | | | |
|---|---|---|---|
| 2,475,952 | 7/1949 | Fuerst | 95—62 |
| 2,507,148 | 5/1950 | Fuerst | 95—62 |
| 3,223,015 | 12/1965 | Rentschler | 95—62 |

NORTON ANSHER, Primary Examiner

L. H. McCORMICK, Jr., Assistant Examiner